US012525311B2

(12) United States Patent
Laurent

(10) Patent No.: US 12,525,311 B2
(45) Date of Patent: Jan. 13, 2026

(54) METHODS AND SYSTEMS FOR REDUCING ECC POWER CONSUMPTION

(71) Applicant: Micron Technology, Inc., Boise, ID (US)

(72) Inventor: Christophe Laurent, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 305 days.

(21) Appl. No.: 17/802,034

(22) PCT Filed: Mar. 2, 2021

(86) PCT No.: PCT/IB2021/020011
§ 371 (c)(1),
(2) Date: Sep. 9, 2022

(87) PCT Pub. No.: WO2022/185091
PCT Pub. Date: Sep. 9, 2022

(65) Prior Publication Data
US 2024/0221857 A1 Jul. 4, 2024

(51) Int. Cl.
*G11C 29/00* (2006.01)
*G11C 29/42* (2006.01)

(52) U.S. Cl.
CPC .................... *G11C 29/42* (2013.01)

(58) Field of Classification Search
None
See application file for complete search history.

(56) References Cited

U.S. PATENT DOCUMENTS

| 3,665,396 | A | 5/1972 | Forney, Jr. | |
| 10,388,394 | B2 | 8/2019 | Tate et al. | |
| 10,482,990 | B2* | 11/2019 | Hoya | G06F 11/106 |
| 2014/0068378 | A1* | 3/2014 | Yoshii | H03M 13/154 |
| | | | | 714/764 |
| 2015/0370636 | A1 | 12/2015 | Sole et al. | |
| 2016/0048425 | A1* | 2/2016 | Kim | G11C 29/52 |
| | | | | 714/764 |
| 2016/0162352 | A1* | 6/2016 | Singhai | G06F 11/1048 |
| | | | | 714/773 |

(Continued)

OTHER PUBLICATIONS

International Search Report and Written Opinion from related International Patent Application No. PCT/IB2021/020011, dated Dec. 1, 2021, 10 pages.

*Primary Examiner* — Mujtaba M Chaudry
(74) *Attorney, Agent, or Firm* — Brooks, Cameron & Huebsch, PLLC

(57) ABSTRACT

Operating an array of memory cells can include storing user data in memory cells of the memory array, storing parity data associated with the user data in a number of parity cells of the memory array, the parity data corresponding to selectable Error Correction Code (ECC) correction capabilities from a minimum ECC correction capability to a maximum ECC correction capability, calculating an ECC syndrome from the stored user data and parity data, based on the ECC syndrome, determining a number of errors in the data, and, based on the determined number of errors, selecting an ECC correction capability of the plurality of ECC correction capabilities. Related memory devices and systems are also herein disclosed.

25 Claims, 9 Drawing Sheets

(56) References Cited

U.S. PATENT DOCUMENTS

| | | | |
|---|---|---|---|
| 2017/0139769 A1* | 5/2017 | Blaichman | H03M 13/3707 |
| 2017/0372798 A1* | 12/2017 | Hoya | G11C 11/1677 |
| 2019/0035474 A1 | 1/2019 | Tassan et al. | |
| 2020/0183782 A1* | 6/2020 | Nakai | G06F 11/1068 |
| 2020/0301776 A1 | 9/2020 | Cha et al. | |
| 2020/0313694 A1 | 10/2020 | Wu et al. | |
| 2021/0211141 A1* | 7/2021 | Kim | H03M 13/3707 |

* cited by examiner

| 500a | 500b | 500c | 500d | 500e | 500f |
|---|---|---|---|---|---|
| 520 | 5 | 1.0101% | 0.050505 | 1.0101% | 0.050505 |
| No error | 0 | 98.9899% | 0.0 | 98.9899% | 0.0 |
| 530' | 25 | - | - | 1.0000% | 0.25 |
| 530'' | 50 | - | - | 0.0100% | 0.0050 |
| 530''' | 100 | 1.0101% | 1.0101 | 0.0001% | 0.0001 |
| | | | 1.060605 | | 0.305605 |

FIG. 5B

| 600a | 600b | 600c | 600d | 600e | 600f |
|---|---|---|---|---|---|
| 620 | 5 | 1.0101% | 0.050505 | 1.0101% | 0.050505 |
| No error | 0 | 98.9899% | 0.0 | 98.9899% | 0.0 |
| 630' | 25 | 1.0101% | - | 1.0000% | 0.25 |
| 630''' | 100 | | 1.0101 | 0.0101% | 0.0101 |
| | | | 1.060605 | | 0.310605 |

FIG. 6B

METHODS AND SYSTEMS FOR REDUCING ECC POWER CONSUMPTION

PRIORITY INFORMATION

This application is a National Stage Application under 35 U.S.C. § 371 of International Application Number PCT/IB2021/020011, filed on Mar. 2, 2021, the contents of which are incorporated herein by reference.

TECHNICAL FIELD

The present disclosure relates generally to the management and operation of an array of memory cells, and more particularly to methods and systems for improving the performances of memories having Error Correction Code (ECC) protection in order to reduce ECC power consumption.

BACKGROUND

Memory devices are used in many electronic systems such as mobile phones, personal digital assistants, laptop computers, digital cameras and the like. Various types of memories are used in memory devices, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Nonvolatile memories retain their contents when power is switched off, making them good choices in memory devices for storing information that is to be retrieved after a system power-cycle. In particular, non-volatile memory cells may maintain their stored logic state for extended periods of time even in the absence of an external power source.

The information is stored by programming different states of a memory device. For example, binary devices have two states, often denoted by a logic "1" or a logic "0." In other systems, more than two states may be stored. In order to access the stored information, a component of the memory device may read, or sense, the stored state. In order to store the information, a component of the memory device may write, or program, the logic state.

Improving memory devices may include increasing memory cell density, increasing read/write speed, increasing reliability, increasing data retention, reducing manufacturing costs, scaling smaller than traditional devices, as well as reducing power consumption.

Memory cells have varying physical and electrical characteristics during their life cycle due to various factors such as number of accesses, quality of the manufacturing process, environmental factors, and the like. Error Correction Code (ECC) is usually calibrated on a defined status of the cells of the memory device (e.g., end-of-life reliability of the cells), and therefore is generally used at its highest correction power over the entire life of the array. Consequently, there is often an excessive power consumption. It is thus desirable to improve power consumption performances of the memory device.

BRIEF DESCRIPTION OF THE DRAWINGS

FIG. 5B is a table listing an estimated power consumption of an ECC engine according to the embodiment of FIG. 5A;

FIG. 6B is a table listing an estimated power consumption of an ECC engine according to the embodiment of FIG. 6A.

DETAILED DESCRIPTION

With reference to those drawings, methods and systems for an improved operation of memory cells and for reducing ECC power consumption will be disclosed herein.

In the following detailed description, numerous specific details are set forth to provide a thorough understanding of claimed subject matter. However, it will be understood by those skilled in the art that claimed subject matter may be practiced without these specific details. In other instances, methods, apparatuses and/or systems that would be known by one of ordinary skill have not been described in detail so as not to obscure claimed subject matter.

Nonvolatile memories retain their contents when power is switched off, making them good choices for storing information that is to be retrieved after a system power-cycle. A Flash memory is a type of nonvolatile memory that retains stored data and is characterized by a very fast access time. Moreover, it can be erased in blocks instead of one byte at a time. Each erasable block of memory comprises a plurality of nonvolatile memory cells arranged in a matrix of rows and columns. Each cell is coupled to an access line and/or a data line. The cells are programmed and erased by manipulating the voltages on the access and data lines. Access circuitry can differentiate between different logic states of a memory cell. For example, in case of a memory read, the access circuitry applies a voltage pulse with a particular magnitude and polarity to access lines, which results in an electrical response that dedicated sense circuitry can detect. Detecting electrical responses can include, for example, detecting one or more of a voltage drop (e.g., a threshold voltage) across terminals of a given memory cell of the array, current through the given memory cell, and a threshold event of the given memory cell.

In the present disclosure, the term "coupled" can refer to elements that are physically, electrically, and/or communicatively connected either directly or indirectly, and may be used interchangeably with the term "connected" herein. Physical coupling can include direct contact. Electrical coupling includes an interface or interconnection that allows electrical flow and/or signaling between components. Communicative coupling includes connections, including wired and wireless connections, that enable components to exchange data.

Figure 1:
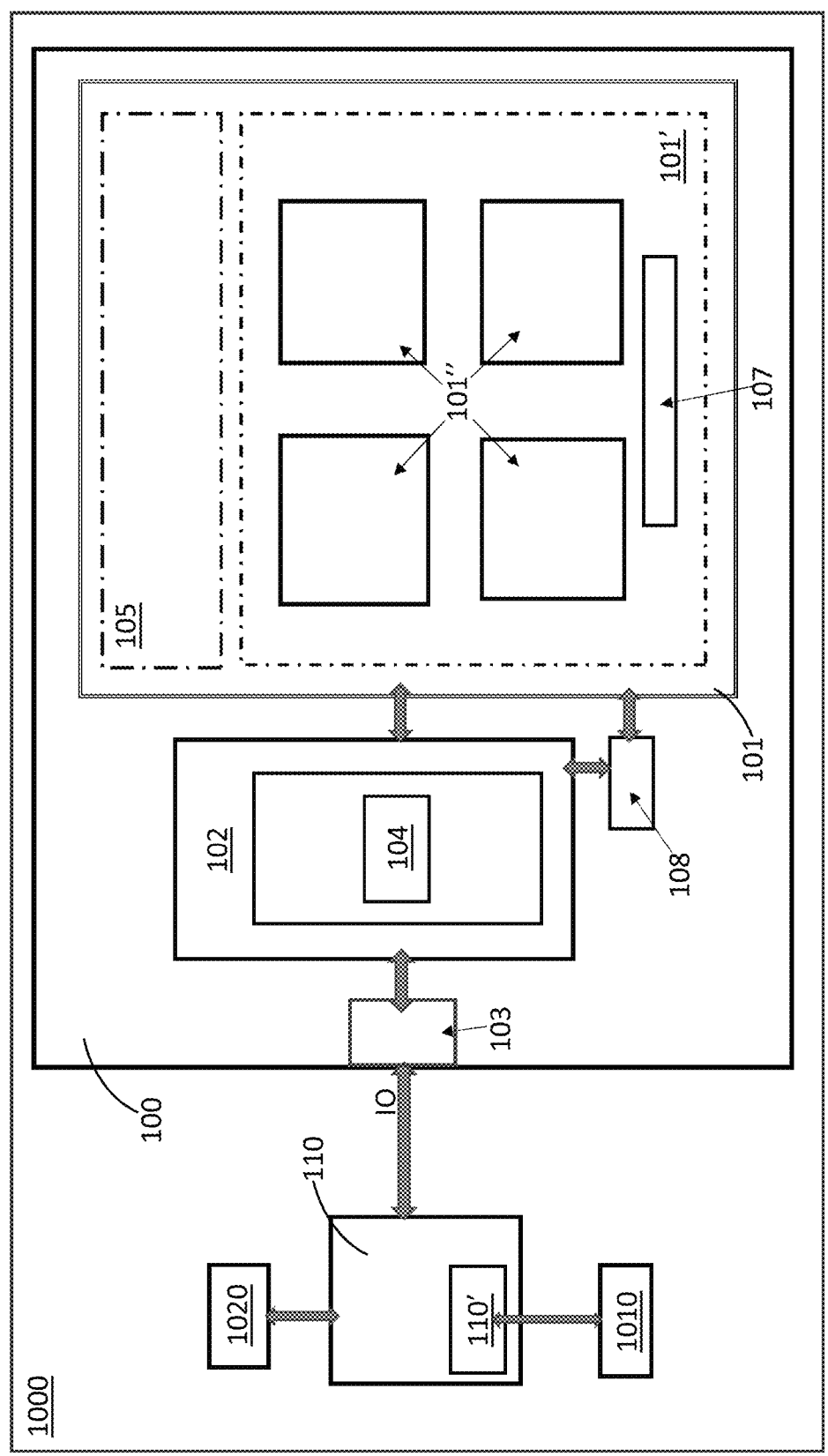
FIG. 1 is a schematic block diagram of a system comprising a memory device that may be operated according to the present disclosure.

FIG. 1 is a schematic high-level block diagram of a system 1000 comprising a memory device 100 according to an exemplary embodiment of the present disclosure, this memory device 100 being arranged, programmed and configured to perform the ECC techniques disclosed below and having dedicated ECC circuit portions.

The memory device 100 can be a solid-state drive (SSD), for instance, and can include a memory section 101, a controller 102, and a host interface 103. The memory section 101 is not limited to a particular architecture and can include different types of memories.

The controller 102 may be coupled to the host interface 103 and to the memory section 101 via a plurality of channels and can be used to transfer data between the memory section 101 and a host 110. The host interface 103 can be in the form of a standardized interface. For example, when the memory device 100 is used for data storage in a computing system, the host interface 103 can be a serial advanced technology attachment (SATA), peripheral component interconnect express (PCIe), or a universal serial bus (USB), among other connectors and interfaces. In general, the host interface 103 can provide an interface for passing control, address, data, and other signals between the memory device 100 and the host 110.

The controller 102 can include an embedded firmware and is adapted to internally manage and control the operation of the memory section 101. The controller 102 can communicate with the memory section 101 to control data read, write, and erase operations, among other operations. For example, the controller 102 can include a number of components in the form of hardware and/or firmware (e.g., one or more integrated circuits) and/or software for controlling access to the memory section 101 and/or for facilitating data transfer between the host 110 and said memory section 101.

The memory controller 102 thus represents control logic of the device, for example acting in response to command by the host 110 (which may generally be an external managing system of the non-volatile memory). As will be disclosed in the following, in one embodiment, the memory controller 102 can also be implemented in the host 110, in particular as part of a host processor 110', even if the present disclosure is not limited by a particular architecture.

As disclosed in relation to FIG. 1, the memory controller 102 may receive user data through input/output IO. Multiple signal lines couple the memory controller 102 with the memory section 101. For example, such signal lines may include clock, command/address and write data (DQ), read DQ, and zero or more other signal lines. The memory controller 102 may thus be operatively coupled to the memory section 101 via suitable buses.

The memory device 100 can also comprise other components (not shown) such as processor units coupled to the controller 102, antennas, further connection means with the host device 110, and the like. In any case, the present disclosure is not limited by a specific configuration of the memory device 100.

Moreover, the controller 102 can also include its own memory section (not shown) operatively coupled with other units thereof. In any case, the present disclosure is not limited by a particular configuration of the controller 102.

The memory device 100 may be a portable device configured to be coupled to the host device 110. However, in other embodiments not shown in the drawings, the memory device 100 can also be embedded within one or more host devices. The host 110 may be for example a personal computer, a tablet, a smartphone, a server or the like. The host 110 can include a system motherboard and/or backplane and can include a number of memory access devices (e.g., a number of processors).

In an embodiment, the controller 102 includes an Error Correction Code (ECC) unit 104, also referred to as ECC engine, which is structured and configured to operate according to techniques as described in the following.

The ECC unit 104 can include error correction circuits and logics to detect and correct a number of bit errors, according to embodiments of the present disclosure. The ECC unit 104 is not limited to circuitry (e.g., hardware) implementations. For instance, in addition, the ECC unit 104 can be implemented in firmware, and/or software.

The ECC unit 104 can be embodied by discrete components such as an application specific integrated circuit (ASIC) or by components that reflect functionally provided by circuitry within the controller 102 that does not necessarily have a discrete physical form separate from other portions of the controller 102. Although illustrated as components within the controller 102, the ECC unit 104 can be external to the controller 102 or can have a number of components located within the controller 102 and a number of components located external to the controller 102, wherein the present disclosure is not limited by a specific hardware architecture. The ECC unit 104 can include separate encoding and decoding components, in a number of embodiments. In general, the memory device 100 thus comprises an operating unit (or operating circuit), indicated as 104, which is an ECC engine (which in turn may be coupled to the controller 102).

In other words, the error detection/correction circuitry of the ECC unit 104, which may be programmed as disclosed below, can include hardware logic to implement an ECC to detect errors occurring in data read from memory section 101. In one embodiment, error detection/correction circuitry also corrects errors (up to a certain error rate based on the implemented ECC code).

The memory section 101 of the memory device 100 can be a flash memory including an array of memory cells, for example a NAND memory, NOR memory, AND memory, and the like. Additionally or alternatively, memory section 101 may comprise bit alterable memory cells; for example, Phase Change Memory (PCM), Ferroelectric Memory (Fe-RAM), Magnetic Memory (MRAM), chalcogenide-based Self Selecting Memory (SSM), etc. Any kind of memory may be employed in embodiments of the present disclosure. For example, the disclosure applies to either or both non-volatile and volatile memories.

In general, the memory section 101 may comprise an array of memory cells 101'. Non-volatile memories may comprise a plurality of blocks, each block being indicated herein with the reference number 101" and comprising a defined number of pages. For the sake of simplicity, only four blocks 101" are shown in the example of FIG. 1.

The memory section 101 represents the memory resource for the memory device 100. In one embodiment, the array of memory cells 101' is managed as rows of data, accessed via wordline (rows) and bitline (individual bits within a row) control. The array of memory cells 101' can be organized as separate channels, ranks, and banks of memory, in general in a plurality of portions, as previously disclosed. Channels are independent control paths to storage locations within memory section. Ranks refer to common locations across multiple memory devices (e.g., same row addresses within different devices). Banks refer to arrays of memory locations within a memory device. In one embodiment, banks of memory are divided into sub-banks with at least a portion of shared circuitry (e.g., drivers, signal lines, control logic) for the sub-banks. It will be understood that channels, ranks, banks, or other organizations of the memory locations, and combinations of the organizations, can overlap physical resources. For example, the same physical memory locations can be accessed over a specific channel as a specific bank, which can also belong to a rank. Thus, the organization of memory resources will be understood in an inclusive, rather than exclusive, manner.

In other words, according to an embodiment of the present disclosure, the array of memory cells 100' may be subdivided into a plurality portions, such as a page, a single block, a group of blocks, or even all blocks (i.e., all the cells), the invention not being limited thereto. The memory cells can thus be grouped, for instance, into a number of blocks including a number of physical pages. A number of blocks can be included in a plane of memory cells and an array can include a number of planes.

Embodiments are not limited to a particular type of memory array or array architecture and the techniques of the present disclosure may be applied to several memory technologies (e.g., planar, cross-point, 3D, etc.).

Memory section 101 may also comprise a further circuit 105 operatively coupled to the array of memory cells 101'.

In one embodiment, the circuit 105 includes access circuitry and sense circuitry to detect electrical responses of the one or more memory cells to an applied read voltage. In one embodiment, the sense circuitry includes sense amplifiers. FIG. 1 illustrates the circuit 105 as being embedded in the memory section 101; however, other embodiments can include access circuitry and/or sense circuitry that is separate from the memory section 101. For example, access circuitry and sense circuitry can be included in a memory controller such as the memory controller 102.

Furthermore, the memory device 100, in particular the array of memory cells 101' of the memory section 101, may comprise a non-volatile region 107 apt to store operating information, for example for the management of the memory array according to embodiments disclosed in the following.

In one embodiment, the memory device 100 may also comprise a sensing unit 108 comprising one or more sensors operatively coupled to the memory section 101 and optionally to the controller 102. The sensing unit 108 may be configured to detect a status (e.g., the temperature) of the array of memory cells 101' or of a portion thereof.

Generally, the particular architecture of the memory device 100 may vary according to the needs and/or circumstances without limiting the scope of the present disclosure.

The host 110 and the memory device 100 may form the system 1000. As mentioned before, the host device 110 is a computing device in accordance with any embodiment described herein, and can be a laptop computer, a desktop computer, a server, a gaming or entertainment control system, a scanner, copier, printer, routing or switching device, embedded computing device, or other electronic device such as a smartphone. The host 110 may generally be a system managing the memory section 101, which may be embedded in said system or generally managed by said system. The memory device 100 may thus be managed by an external controller, i.e., the controller embedded in the processor 110' of the host 110, as previously disclosed, so that the ECC unit may also be included in said external controller. In this case, the controller of the memory device may not be present and the memory device 100 (which may be embedded in the host 110) communicates the required information to the external controller.

In one embodiment, the system 1000 includes an interface 1010 coupled to the processor 110', which can represent a higher speed interface or a high throughput interface for system components that needs higher bandwidth connections, and/or graphics interface components. Graphics interface interfaces to graphics components for providing a visual display to a user of system 1000. In one embodiment, graphics interface generates a display based on data stored in the memory device or based on operations executed by processor or both.

The system may also comprise network interface 1020 communicatively coupled to the host or to memory device for example for connecting with other systems, and/or a battery coupled to provide power to said system.

According to the present disclosure, the ECC unit 104 may be configured to perform an ECC operation (detection and/or correction of errors) with a certain error correction capability on a codeword stored in the memory section 101, wherein the codeword includes a certain number of parity bits, as it will be disclosed in the following. The ECC correction capability may vary on the fly for a given memory portion depending on the number of errors.

Figure 2:
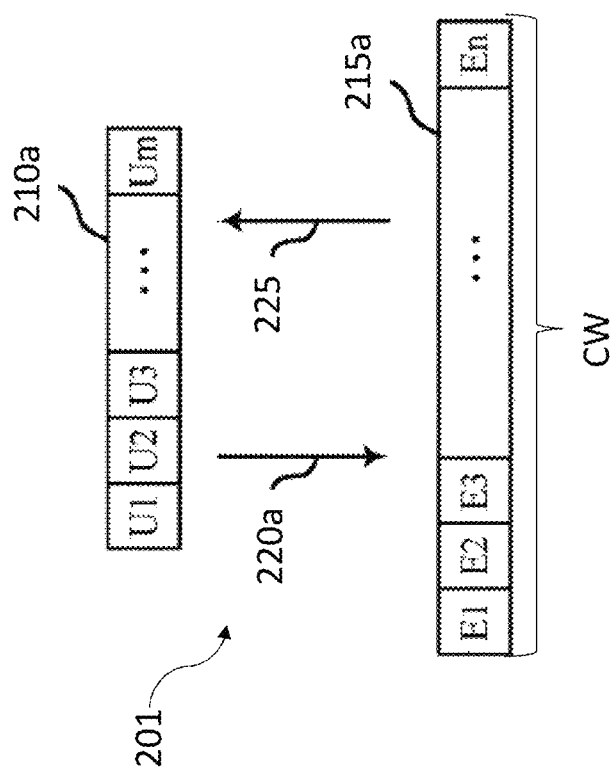
FIG. 2 is an example of user data pattern encoded according to embodiments of the present disclosure.

FIG. 2 illustrates an exemplary user data pattern diagram 201. The user data pattern diagram 201 includes user data 210a and encoded user data 215a. Encoding process 220a, which is performed in the programming phase of the array of memory cells, may convert the user data 210a (U1, . . . , Um) into the encoded user data 215a (E1, . . . , En). The encoded user data 215a may be stored in a set of memory cells, which may be, for example, memory cells of the memory section 101 of FIG. 1. Each box of the encoded user data 215a may correspond to a memory cell that may exhibit a logic state of 1 or a logic state of 0. In embodiments of the present disclosure, during the encoding process 220a, a number of parity bits may be added to the user data (or payload) 210a. A number of bits in the encoded user data 215a may be greater than the number of bits in the user data 210a (e.g., n is larger than m if some bits, e.g., parity bits, are added). Process 225 may convert the encoded user data 215a back to the user data 210a after the encoded user data 215a have been accurately read.

In an embodiment, the plurality of encoded bits to be read represents a codeword (CW). The codeword may be programmed to include various information to be used during the reading phase. In order to keep a smooth and simple description, in the following reference will be made to ECC-related information only. It is understood that the additional bits may also include not strictly ECC-related information, though. Examples may include encryption bits, scrambling bits, bits for balanced or quasi-balanced codes (e.g., to achieve a predefined percentage, or within a percentage range, of bits in a given logic state, such as 50% of is or Os), and/or other purpose additional bits.

As mentioned before, when digital data are stored in a memory (such as the array of memory cells 101' of FIG. 1), data are encoded in such a way that a decoder can identify and correct errors, i.e., data strings are encoded by adding a number of parity bits. When the original data is to be reconstructed, the decoder examines the encoded message to check for any errors. In certain embodiments, a block of user data bits is encoded to become a block of n bits (i.e., the codeword CW), as shown in FIG. 2. However, various encoding schemes are possible.

During the lifetime of the memory array, the Bit Error Rate (BER) associated with the data stored in the array or in a portion thereof is not constant.

Generally, the power consumption of an ECC circuitry depends on its correction capability. For Example, an ECC3 circuitry may require more power than ECC2 or ECC1 circuitry in the same conditions (wherein ECC3 may be an error correction code with correction capability of 3 bits, ECC2 may be an error correction code with correction capability of 2 bits, and ECC1 may an error correction code with correction capability of 1 bit, in some examples).

The occurrence probability of a higher number of errors in a codeword decreases by orders of magnitude, and the present disclosure provides techniques enabling a power consumption that is proportional to the detected number of errors. In order to reduce power consumption, according to the present disclosure, an ECC circuit is capable to calculate the number of errors in a codeword and to adapt on the fly (e.g., based on the error number calculation) its correction power to the number of detected errors. For example, in some embodiments, the ECC circuit can be implemented in independent circuit portions or blocks, each block having a different correction power, wherein ECC correction power to be applied is not selected a priori. For example, a lower ECC correction is selected when the number of errors is low, and a higher ECC correction is selected when the number of errors is higher. In other words, the present disclosure provides a technique to precisely define the ECC correction capability (or ECC protection level) to be applied to the cells of a memory array according to the number of errors detected.

On the basis of the encoding scheme, a codeword is generated (e.g., as in process 220a) by manipulating the user data bits and adding a number of parity bits, the number of added parity bits being a fixed number corresponding to a defined maximum ECC correction capability. Based on the decoding scheme, an ECC syndrome is then produced from the encoded set of user and parity data, for instance by means of the ECC unit 104 of FIG. 1. The ECC syndrome changes depending on the presence and location of errors. When errors are detected, the ECC unit 104 is able to correct said errors up to and according to the implemented correction capability. In some cases, the presence of an uncorrectable error (e.g., in excess of the maximum correction capability and the location of which is unknown) may be reported.

At read back, the codeword is accessed and decoded according to a selected ECC scheme. An ECC engine (implemented in hardware, for example) with a given maximum correction capability may operate at different correction capabilities each requiring a corresponding circuitry and power consumption.

Figure 3:
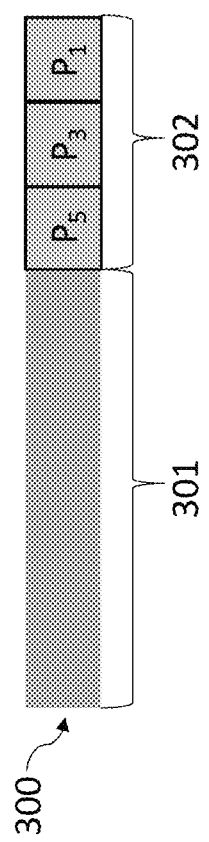
FIG. 3 shows an example of a codeword subjected to techniques according to the present disclosure.

FIG. 3 shows an example of a codeword 300 comprising a first codeword portion 301 corresponding to the payload (thus including encoded user data), and a second codeword portion 302 corresponding to the parity data. It is noted that such a distinction may be somehow arbitrary; as a matter of fact, an encoding process (such as process 220a in FIG. 2) may combine and mix the user data and the parity data so that the codeword as a whole should be considered.

In this example, the parity data include parity bits stored in parity cells denoted as $P_1$, $P_3$ and $P_5$. In other words, in the example of the Figures, a number of bits to calculate syndrome $S_1$ (corresponding to ECC1), syndrome S3 (corresponding to ECC2) and syndrome $S_5$ (corresponding to ECC3) is stored—syndrome calculation and use will be described in further detail below. It is observed that a single block of the codeword portion 302 does not necessary correspond to a single cell and may also corresponds to a group of cells, e.g., it generally represents the number of bits to calculate the syndrome for a corresponding ECC correction capability. Moreover, it should be understood that, while three levels of protection are depicted in FIG. 3 (e.g., ECC1, ECC2 and ECC3), any number may be conceived. For example, embodiments with higher (e.g., N>3) error correction capability are possible.

Therefore, according to the present disclosure, user data are stored in a plurality of memory cells of the memory array, as well as parity data associated with the user data are stored in a number of parity cells, wherein the parity data (whose number is predetermined, in some embodiment) allow the selection of a plurality of Error Correction Code (ECC) correction capabilities up to maximum ECC correction capability (corresponding to the total number of stored parity data). The ECC engine, when considered in its entirety, has a defined maximum error correction capability, e.g., protection level; however, it may advantageously also be operated to an inferior error correction capability corresponding to the number of calculated errors on a case-by-case operation, by activating only dedicated circuit portions, in some examples. This leads to an on-the-fly ECC power optimization, creating a decoder that is configured to enable only the mandatory logic.

More specifically, the present disclosure provides calculating an ECC syndrome from the stored user data and parity data and checking if the syndrome is different from zero. Then, based on the calculated ECC syndrome, if errors are detected, a number of errors in the data is determined, and finally an ECC correction capability of the plurality of ECC correction capabilities is selected based on said determined number of errors.

Figure 4:
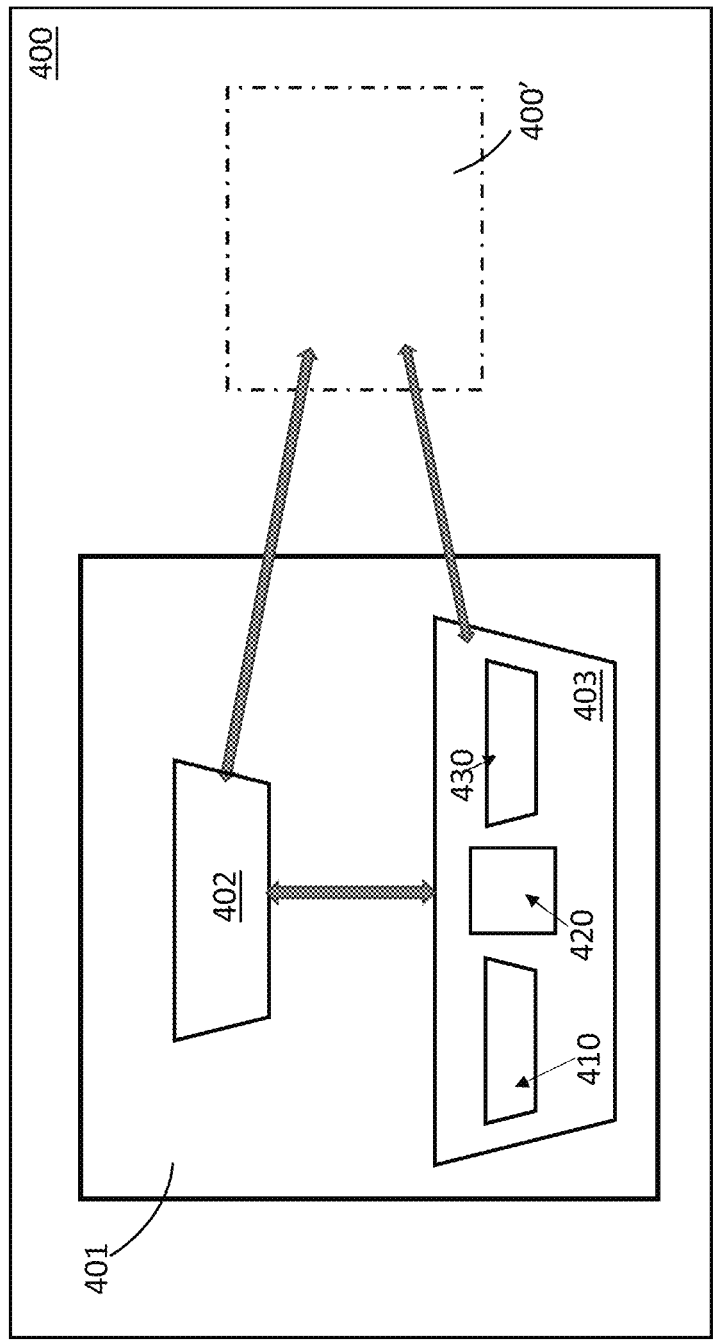
FIG. 4 is a schematic block diagram of an operating circuit for managing Error Correction Code (ECC) operation in a memory device according to an embodiment of the present disclosure.

FIG. 4 is a schematic block diagram of an operating circuit 401 for managing Error Correction Code (ECC) operation in a memory device 400 according to an embodiment of the present disclosure. As shown in FIG. 4, a memory device 400 (which may correspond to memory device 100 of FIG. 1) comprises an operating circuit 401 for managing the operation of an array of memory cells 400', which may correspond to array 101' of FIG. 1. The operating circuit 401 may be part of a controller of the device, such as controller 102 of FIG. 1, or may be external to the controller, or can have a number of components located within the controller and a number of components located external to the controller, wherein the present disclosure is not limited by a specific hardware architecture.

The operating circuit 401 (which may correspond to ECC unit 104 of FIG. 1, in some examples) can include error correction circuitry and logics to detect and correct a number of bit errors (up to a certain error rate based on the implemented ECC code), according to embodiments of the present disclosure. The operating circuit 401 can be embodied by discrete components such as an application specific integrated circuit or by components that reflect functionally provided by circuitry within the controller that does not necessarily have a discrete physical form separate from other portions of the controller. Therefore, in the present disclosure, the term "operating circuit" is used in a general and nonlimiting way.

The operating circuit 401 can include separate encoding and decoding components, in a number of embodiments. More in particular, as shown in FIG. 4, the operating circuit 401 comprises an encoding unit 402 configured to generate a codeword according to encoding schemes. The codeword may comprise payload data stored in a plurality of memory cells and parity data associated with the payload data stored in parity cells, as shown with reference to the codeword 300 of FIG. 3.

The operating circuit 401 further comprises a decoding unit 403 configured to perform an ECC operation (such as bit error detection and/or correction) on the stored codeword based on a selected ECC correction capability, e.g., based on an actual number of errors to be corrected. Therefore, the operating circuit 401 is able to generate a codeword comprising payload data and parity data via the encoding unit 402 and to process said codeword via the decoding unit 403. The encoding unit 402 and the decoding unit 403 may be operatively connected to each other and to the array 400'.

The decoding unit 403 may comprise a syndrome generating unit 410 configured to generate an ECC syndrome from the parity data stored in the input codeword. Moreover, the decoding unit 403 may comprise an error unit 420 which is activated when errors are detected and is configured to account for the number of errors contained in the codeword. The decoding unit 403 may further comprise a syndrome decoding unit 430 configured to process the syndrome and to perform a corresponding ECC operation on the stored data.

According to the present disclosure, the memory device 400 comprises a plurality of circuit portions, each circuit portion being configured to perform a specific ECC operation on the stored data and being selectively activable by the operating circuit according to the required correction, e.g., based on the detected number of errors. In other words, the selection of an ECC protection level or correction capability involves selectively activating a circuit portion of the plurality of circuit portions. In an embodiment, the circuit portions form the syndrome decoding unit 430.

As already observed for the operating circuit 401, in the present disclosure also the term "circuit portions" is used in a general and nonlimiting way and may be embodied in several ways.

The circuit portions may be activable alone or in groups, in some examples. In an embodiment of the present disclosure, the operating circuit is configured to selectively disable circuit portions relating to unselected ECC correction capabilities.

Based on this general architecture, the present disclosure provides techniques to optimize the ECC operation in order to reduce power consumption.

Figure 5A:
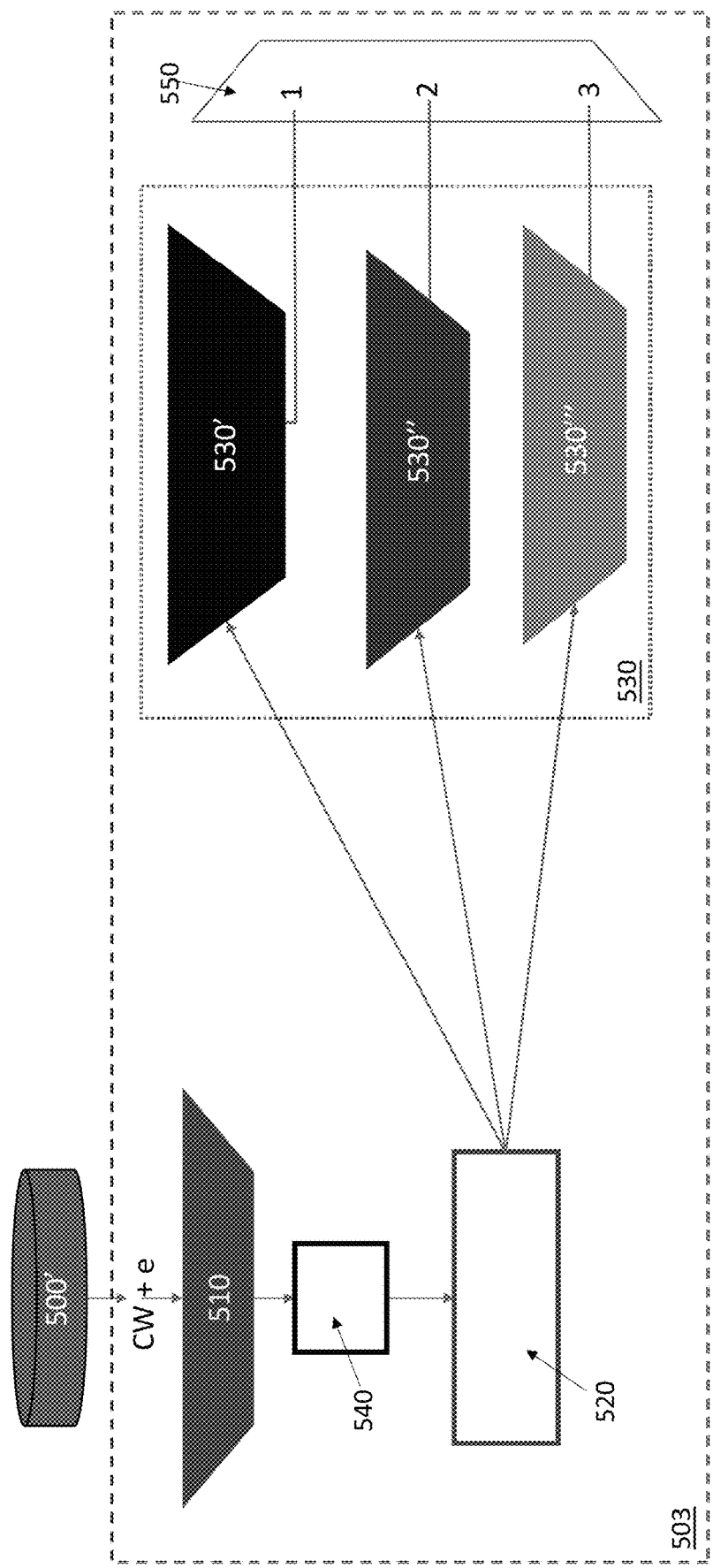
FIG. 5A is an example of a selection of ECC correction capabilities and related circuit portions according to an embodiment to the present disclosure.

In an embodiment represented in FIG. 5A, a plurality of circuit portions 530'-530''' comprises a single specific circuit portion for each single specific selectable ECC correction capability or protection level. In the example of FIG. 5A, different and separate circuit portions for each different selectable ECC correction capability are therefore used in the decoding unit.

An output of the selectively activated circuit portion may be selectively enabled based on the determined number of errors, for example, by a selector element—such as a multiplexer—in decoding unit 403 (not shown). The selector may simultaneously disable respective outputs of circuit portions in the plurality of circuit portions that have not been selected/activated.

In the example of FIG. 5A, a codeword CW is stored in an array 500' (which may correspond to array 400' of FIG. 4). When the codeword CW is stored in the array 500', an error may occur, this error being denoted as "e" in FIG. 5A. The codeword CW is then fed as an input to decoding unit 503 (which may correspond to decoding unit 403 of FIG. 4). More in particular, a syndrome is generated by syndrome generating unit 510 (which may correspond to syndrome generating unit 410 of FIG. 4), and then, if an error is detected, the error number is calculated by error unit 520 (which may correspond to the error unit 420 of FIG. 4). In an embodiment, the error unit 520 is activated by a logic unit 540 configured to enable said error unit 520 in case errors are detected (e.g., when at least one value of the ECC syndrome is different from zero). Syndrome decoding unit 530 (which may correspond to the syndrome decoding unit 430 of FIG. 4) is then apt to receive and process the codeword CW and to execute an ECC operation according to the techniques of the present disclosure, so that a corrected codeword is output. As mentioned before, in this embodiment, the syndrome decoding unit 530 comprises a specific circuit portion for each single specific selectable ECC correction capability (e.g., one circuit portion for ECC1, denoted as 530', one circuit portion for ECC2, denoted as 530'', and one circuit portion for ECC3, denoted as 530'''). Therefore, in this embodiment, ECC hardware specialized for a single ECC correction capability is provided, and only the ECC block specialized for correcting the determined error number is enabled. In other words, in the embodiment of FIG. 5A, the operating circuit (in particular the syndrome decoding unit 530) is configured to selectively activate one of said specific circuit portions based on the determined number of bit errors for each single specific selectable ECC correction capability.

The decoding unit 503 comprises selector element 550 coupled to each ECC circuit portion 530' (active for ECC1), 530'' (active for ECC2) and 530''' (active for ECC3). Based on the determined number of errors, selector element 550, is configured to selectively enable the output of the only one circuit portion 530', 530'' or 530''' that has been activated to correct the detected error(s) or allow output of uncorrected data in case of no detected error. In other words, using selector 550, it is possible to selectively enable an output of the selectively activated circuit portion of the plurality of circuit portions based on the determined number of errors. The selector may simultaneously disable respective outputs of circuit portions in the plurality of circuit portions that have not been activated. Selector element 550 may be a multiplexer, in some examples.

If the calculated syndrome of the codeword is zero, there are no errors in the corresponding codeword, which is transmitted as output without further processing.

Clearly, it should be understood that while three levels of protection are depicted in FIG. 5A (e.g., ECC1, ECC2 and ECC3), any number may be conceived.

As mentioned above, in this embodiment, the operating circuit is configured to selectively disable circuit portions whose correction capability does not match the determined number of errors. In other words, circuit portions having correction capability not corresponding to the determined number of errors (e.g., a higher ECC correction capability) may be disabled, so as to reduce power consumption.

FIG. 5B is a table listing an estimated power consumption of an ECC engine according to the embodiment of Figure 5A. This consumption is then compared with consumption of standard technologies in which the highest correction power is always used, e.g., independently of the number of detected errors.

In the table of Figure 5B, first column 500*a* lists the ECC components involved, i.e., the error unit 520 and circuit portions with different correction powers, 530', 530'' and 530'''. The case in which no errors are detected is also listed. Syndrome generating unit 510 is operating in all cases, e.g., independently of if and how many errors are detected, so it is not reported in Figure 5B.

Second column 500*b* lists the power consumption of the different types of block scaled to the power consumption of circuit portion 530''' that has the maximum power consumption, identified as "100". The circuit portion 530''', if present, when activated typically consumes half of the circuit portion 530''' and thus its power consumption is evaluated as "50"; the circuit portion 530', if present, when activated typically consumes a quarter of the circuit portion 530''' and thus its power consumption is evaluated as "25"; if no errors are detected in the codeword, no circuit portion is activated, and the power consumption is evaluated as "0". The error unit 520 (when it is operated) typically consumes about 5% of the consumption of circuit portion 530''' and the power consumption is evaluated as "5".

The third column 500c lists the probability to use the components listed in the first column 500a in the case of a state-of-the-art ECC implementation, i.e., when only the circuit portion 530''' with the highest correction power is implemented and used. Supposing that the probability to have one error is 1%, that the probability to have two errors is 0.01%, that the probability to have three errors is 0.0001% and that the probability to have more than three errors can be neglected, in 1.0101% of cases one or more errors are present and, correspondingly, the error unit 520 and the circuit portion 530''' are used (the other circuit portions, namely 530' and 530'', are not present in this case). Under these assumptions, the probability to have zero errors is 98.9899%, in which cases none of the components is used (e.g., neither the error unit 520 nor the error correction circuit portion 530''' are necessary and therefore are not activated).

The fourth column 500d lists the weighted power consumption when only the circuit portion 530''' with the highest correction power is implemented and used for the correction of all the errors of the codeword, i.e., the row-by-row product of the second 500b and third 500c columns. The last row is the sum of the weighted power consumptions in the rows above, e.g., it reports the estimated average power consumption according to the state-of-the-art solutions.

The fifth column 500e lists the probability to use each component listed in the first column 500a in the case of optimized ECC implementation when the activation of a circuit portion is selected on the basis of the number of calculated errors, according to the embodiment of figure SA. Supposing that the probability to have one error is 1%, according to the present disclosure in the 1% of the cases the circuit portion 530' is activated. Supposing that the probability to have two errors is 0.01%, according to the present disclosure in the 0.01% of the cases the circuit portion 530'' is activated. Supposing that the probability to have three errors is 0.0001%, according to the present disclosure in the 0.0001% of the cases the circuit portion 530''' is activated. Under the assumptions above (and neglecting for simplicity the effect of possible occurrences with more than three errors), the probability to have zero errors is 98.9899%, and in all these cases none of circuit portions 530', 530'' and 530''' is used. On the other hand, whenever at least one error is present, e.g., in 1.0101% of the cases, the error unit 520 is used.

The sixth column 500f lists the weighted power consumption according to the present disclosure. In each row of column 500f the row-by-row product of the second 500b and fifth 500e columns is reported and the last row is the sum of the weighted power consumptions in the rows above, e.g., it reports the estimated average power consumption according to the disclosure.

Comparing the estimated power consumptions (i.e., the last rows of the fourth 500d and sixth 500e columns), it can be seen that a reduction of more than 70% of power consumption is achieved according to the embodiment of FIG. 5A. Advantageously, this embodiment can guarantee a considerable reduction of the power consumption with respect to the state of the art. Clearly, the above figures for single- or multiple-error rates are just mere examples and actual numbers may differ without prejudice of the disclosed matter.

Figure 6A:
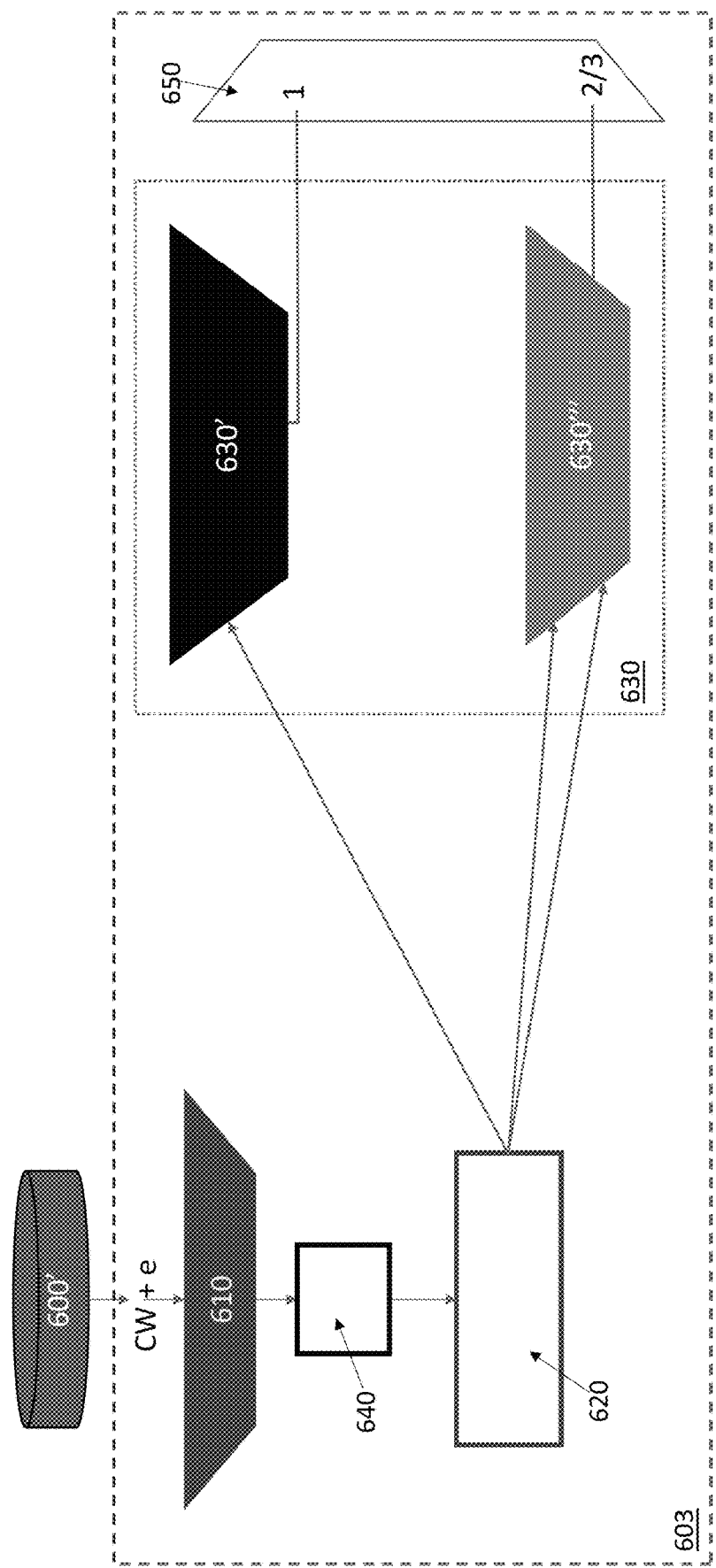
FIG. 6A is an example of a selection of ECC correction capabilities and related circuit portions according to another embodiment to the present disclosure.

According to another embodiment of the present disclosure depicted in FIG. 6A, the operating circuit may comprise a circuit portion configured to handle more than one ECC correction capability or protection level; more specifically, in this embodiment, at least one circuit portion is selectively activable for managing at least two ECC correction capabilities.

For example, when an ECC correction capability is needed (e.g., ECC2 for correcting two errors), a related circuit portion is activated, this circuit portion being configured to handle a plurality of ECC correction capabilities comprising the selected ECC protection level (ECC2, in this example) and at least one higher ECC correction capability (ECC3, for example). In other words, in this embodiment, the operating circuit is configured to selectively activate a circuit portion for applying a first ECC correction capability and at least one higher ECC correction capability, said ECC correction capabilities corresponding to respective determined error numbers.

In the example of FIG. 6A, a codeword CW is stored in an array 600' (which may correspond to array 400' of FIG. 4). When the codeword CW is stored in the array 600', an error may occur, this error being denoted as "e" in FIG. 6A. The codeword CW is then fed as an input to decoding unit 603 (which may correspond to decoding unit 403 of FIG. 4). More in particular, a syndrome is generated by syndrome generating unit 610 (which may correspond to syndrome generating unit 410 of FIG. 4), and then, if an error is detected, the error number is determined by error unit 620 (which may correspond to the error unit 420 of FIG. 4). Syndrome decoding unit 630 (which may correspond to the syndrome decoding unit 430 of FIG. 4) is then apt to receive and process the codeword CW and to apply an ECC operation according to the techniques of the present disclosure, so that a corrected codeword is output. If the calculated syndrome of the codeword is zero, there are not errors in the corresponding codeword, which is transmitted as output without further processing. In an embodiment, the error unit 620 is activated by a logic unit 640 configured to enable said error unit 620 in case errors are detected (e.g., when the ECC syndrome is different from all0, that is different form zero).

In the example of FIG. 6A, the syndrome decoding unit 630 comprises a circuit portion 630' for managing ECC1, and a circuit portion 630''' for managing both ECC2 and ECC3. Therefore, in this embodiment, the circuit portion 630' of the syndrome decoder is apt to handle 1 error case and the circuit portion 630''' is apt to handle 2 or 3 errors case, so that only one ECC1 block is added on top of the ECC3 block.

In other words, in the example of FIG. 6A, an ECC correction capability selection comprises selectively activating a circuit portion (such as circuit portion 630''') for managing at least two ECC correction capabilities, said circuit portion being selectively activable for applying a first ECC correction capability (ECC2 in this example) and at least one higher ECC correction capability (ECC3 in this example).

Since the occurrence probabilities of two and three errors are lower than the probability of having one error, using a single circuit portion, i.e., 630''', to correct both two and three errors does not significantly affect the power consumption but has a benefit in terms of circuit complexity and occupied area.

The decoding unit 603 comprises selector element 650 coupled to each ECC circuit portion 630' (active for ECC1) and 630''' (active for ECC2 and ECC3). Based on the determined number of errors, selector element 650, is configured to selectively enable the output of the only one circuit portion 630' or 630''' that has been activated to correct the detected error or errors, or allow output of uncorrected data in case of no detected error. In other words, using selector 650, it is possible to selectively enable an output of the selectively activated circuit portion of the plurality of circuit portions based on the determined number of errors. The selector may simultaneously disable respective outputs of circuit portions in the plurality of circuit portions that have not been activated. Selector element 650 may be a multiplexer, in some examples.

FIG. 6B is a table listing an estimated power consumption of an ECC engine according to the embodiment of FIG. 6A. This table is similar to the table of FIG. 5B so that, for the sake of simplicity, the related description is not repeated. Columns 600a-600f of FIG. 6B correspond to columns 500a-500f, of FIG. 5B and the only difference is that the circuit portion 530" for managing ECC2 only is not implemented in the embodiment of FIG. 6A, so the corresponding row is omitted and the probability of using circuit portion 630''' includes both the two- and the three-error occurrences (e.g., in the 0.0101% of the cases). The estimated average power consumption (reported in last row of column 600f) is not substantially increased as compared to table of FIG. 5B, so that this embodiment can guarantee a proper balance between the circuit complexity and power consumption reduction.

The techniques of the present disclosure therefore allow a great flexibility in ECC circuitry design. The general idea is to wake up or activate only the desired circuit portion of the decoder based on the detected number of errors (if any). Clearly, if no errors are detected, no circuit portion is enabled. In other words, according to the present disclosure, the proper syndrome decoder is automatically enabled based on the number of errors, obtaining an ECC optimization. For example, the ECC operation is optimized and power consumption is reduced when a lower ECC protection is used, since only the necessary ECC circuitry is enabled and said circuitry generally requires less power. Unused ECC circuitry may then be disabled. For example, if the lowest ECC correction capability (e.g., ECC1) is needed, blocks 530" and 530''' of FIG. 5A, as well as block 630''' of FIG. 6A may be disabled.

In any case, it is to be understood that the usage of one circuit portion or another in a given condition should depend on the consumption thereof, not the hardware complexity or dimension. The power consumption of specific ECC circuits and/or blocks can be evaluated on a case-by-case basis and the disclosed implementations of FIGS. 5A and 6A can be modified without departing from the scope of the present disclosure.

Furthermore, even if in the Figures the circuit portions are illustrated as separate from each other, said circuit portions may also share common portions, for instance in order to reduce the occupied area in the device. For example, in some embodiments, the use of a circuit portion for a higher ECC correction capability or protection level may involve the activation of at least part of a circuitry related to lower ECC correction capabilities. In any case, specific circuitry relating to a specific single ECC correction capability may be disabled when another single ECC protection level is selected. Therefore, generally, the use of a circuit portion for a higher ECC correction capability may or may not involve the activation of part of circuitry related to lower ECC correction capabilities, while unnecessary circuitry may be switched off. Therefore, the circuit portions are logically separate, even if may share common circuitry, in some embodiments.

In some embodiments, the circuit portions may be selectively and independently activable as disclosed above by means of a selector element which comprises multiple inputs, e.g., one input from each circuit portion, and configured for enabling or activating only the output of the desired portion, according to the selected ECC correction capability. In other words, according to the present disclosure, the operating circuit comprises at least one selector element, such as selector element 550 of FIG. 5A or selector element 650 of FIG. 6B, which is configured to selectively enable the output of one circuit portion or sub-circuit portion based on the determined number of errors. For example, in an embodiment, the selector element may be a multiplexer with proper inputs/outputs. In an embodiment, as shown in FIGS. 5A and 6A, the selector element may be downstream the operative circuit portions and the selection of the desired circuit portions is made by said final selector element.

In any case, it is to be understood that the illustrated configuration is only one of many possible configurations and the present disclosure is not limited by the exemplary embodiments shown in the drawings.

Furthermore, a different number of errors may be calculated for different portions of the array of memory cells. Therefore, according to an embodiment of the present disclosure, the memory cells of the array may be grouped into a plurality of portions, each portion being assigned and operated according to a specific ECC correction capability based on a desired protection level. A "portion" of the array is therefore a group of memory cells being assigned the same maximum ECC correction capability "on-the-fly", according to the techniques of the present disclosure. Correspondingly, each respective portion of the plurality of portions may be operated at respective maximum ECC correction capability (ECC1, ECC2, ECC3, or higher). In this way, the array may be split into portions in which the maximum ECC correction capability is coherent but could be different from the maximum ECC correction capability of another portion. The maximum ECC correction capability may be dynamically modified during operation.

According to an embodiment, a memory portion may correspond to an internal subdivision like a bank group, a bank, a section or whatever other suitable internal subdivision of the memory. Moreover, the memory portion may also correspond to a specification/host subdivision like a buffer, a page, i.e., a subdivision at high level. In an embodiment, the whole memory array may be coherent in term of ECC correction capability. During different access operations, such as a read operations, a different number of errors may be determined and the accessed portion is operated according to the corresponding respective correction capability that it actually necessary, based on the actual number of errors detected therein. For example, a page may be operated at an ECC2 maximum correction capability (with only $P_1$ and $P_3$ parity bits being stored) while another page may be operated at an ECC3 maximum correction capability (with $P_1$, $P_3$ and $P_5$ parity bits being stored). In either case, based on the determined number of errors in the accessed codeword, the actually needed ECC correction capability is selected and only the corresponding circuit portion is selectively activated (such as, with reference to Figure 5A, only circuit portion 530' in case of a single error having been determined—note that circuit portion 530''' is always disabled when the maximum correction capability of the page is ECC2, because in this case the number of parity data bits is insufficient to support an ECC3 correction). The maximum ECC correction capability may be dynamically modified during operation. For example, a subsequent lower (or higher) maximum ECC correction capability may be implemented (e.g., different from an antecedent maximum ECC correction capability). As an example, an antecedent ECC3-protected codeword (or memory portion) may be turned into a subsequent ECC2-protected codeword by storing only $P_1$ and $P_3$ parity bits (therefore making available spare bits for possible extra payload storage) rather than $P_1$, $P_3$ and $P_5$ parity bits in antecedent ECC3-protected codeword.

In other words, a portion may correspond to one of a codeword, a bank, a bank group, a section of the array, the entire array, or even a buffer, a page, and the present disclosure is not limited by the way the cells are grouped. The subdivision of the array into several portions is better suited to real memory devices. In each of these respective codeword, pages, banks, sections, etc., user data and parity data may be stored according to a respective maximum ECC correction capability. An ECC syndrome from the stored user data and parity data may be calculated at a read access in the memory portion, for example, and, based on the syndrome, a number of errors in the data may be determined. Based on the determined number of errors, an ECC correction capability of the plurality of ECC correction capabilities may be selected. For example, an ECC correction capability lower than the respective maximum ECC correction capability may be selected because no or fewer errors than correctable have been determined. In some cases, selecting the ECC correction capability comprises selectively activating a circuit portion of a plurality of circuit portions which are configured to perform an ECC operation on the stored data (and deactivating other circuit portions that are not necessary, to reduce power consumption).

Figure 7:
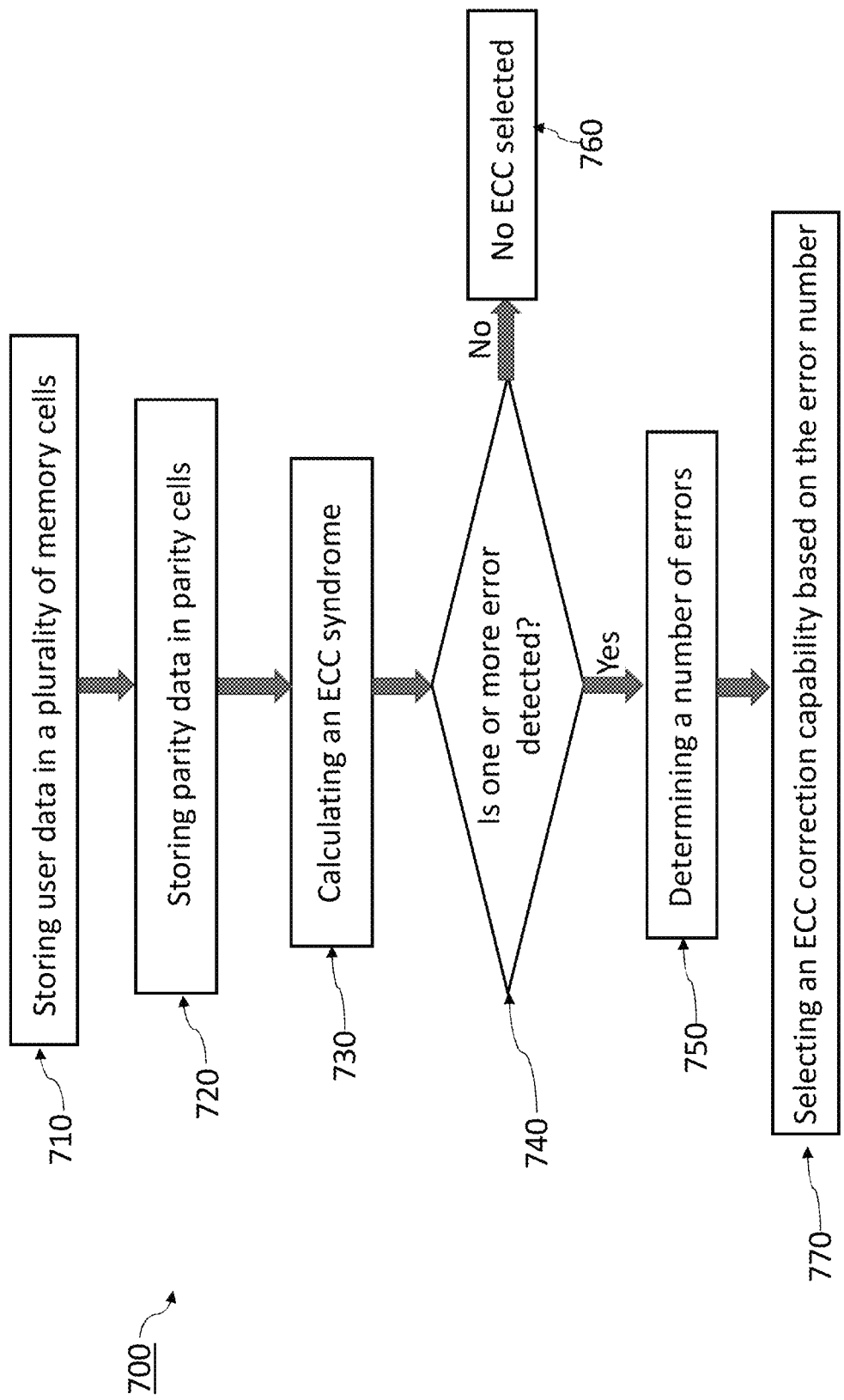
FIG. 7 is a flow diagram of steps of a method according to an embodiment of the present disclosure.

FIG. 7 a is flow diagram representing steps of a method 700 for operating an array of memory cells according to the present disclosure. The processes described can be performed by hardware logic and circuitry. For example, the following processes are described as being performed by encoding 402 and/or decoding 403, 503, 603 units as described in FIGS. 4-6 and/or access circuitry, sense circuitry and ECC circuitry, as disclosed herein. However, other embodiments can include different circuitry configurations suitable for performing the processes.

The method of the present disclosure is a method for improving the operation of memory cells having ECC protection. Access circuitry writes data to a plurality of memory cells. For example, access circuitry writes logic Os and logic 1s to a plurality of memory cells such as the memory cells in the memory section 101 of FIG. 1. In one embodiment, access circuitry can write logic 0 by applying programming pulses with a negative polarity and logic 1 by applying programming pulses with a positive polarity. The opposite convention can also be adopted. Different programming pulses may be applied to memory cells, depending on the technology. After writing data to the plurality of memory cells, access circuitry can read the plurality of memory cells and ECC circuitry can verify the presence of errors and correct them.

More in particular, at step 710, user data are stored in a plurality of memory cells of a memory array, e.g., are stored in a codeword. Operations associated with step 710 may be executed by an encoding unit 402, for example.

At step 720, parity data associated with the user data are stored in a determined number of parity cells of the memory array (e.g., in the codeword), the parity data corresponding to a plurality of selectable ECC correction capabilities from a minimum ECC correction capability to a maximum ECC correction capability. Operations associated with step 720 may be executed by an encoding unit 402, for example.

At step 730, an ECC syndrome is calculated starting from the stored user data and parity data. Operations associated with step 730 may be executed by syndrome generating unit 510 or 610, for example. Then, at step 740, the presence of errors is detected based on the ECC syndrome. Operations associated with step 740 may be executed by logic unit 540, for example.

If errors are detected, the number of said errors is determined at step 750, otherwise, if no errors are detected, no ECC is selected and the data in the codeword is transmitted without applying and ECC operation, as in step 760. Operations associated with step 750 may be executed by error unit 420, 520 or 620, for example.

Finally, at step 770, when the codeword contains one or more errors, based on the number of errors, an ECC correction capability of the plurality of ECC correction capabilities is selected and a corresponding ECC operation is then performed on the codeword. Operations associated with step 770 may be executed by syndrome decoding unit 430, 530 or 630 and respective circuit portions therein, for example. The corrected data is transferred in output. Selector element 550 and 650 may selectively enable the output of the selectively activated circuit portion based on the determined number of errors.

An ECC engine may operate at a different correction capability (e.g., different level of protection from errors), and each of the protection levels requires the activation of a corresponding circuit portion. The ECC operation may be then performed using the selected ECC correction capability.

In conclusion, the present disclosure provides an on-the-fly selectable ECC correction capability based on the number of bit errors to obtain ECC power optimization. According to the present disclosure, the ECC engine is adapted to wake up blocks (herein indicated as circuit portions) thereof based on the determined number of errors. Therefore, only the strictly necessary circuitry is enabled in the ECC engine. More specifically, the ECC engine is configured to enable the lowest power consumption circuit portion able to implement the proper ECC operation. Generally, the probability to have a higher number of errors in a codeword decreases by orders of magnitude and most codewords are error-free or contain only one error. For this reason, the use of highest correction power available in an ECC circuit results in higher power consumption but does not result in a real benefit in terms of data security/accuracy. According to the techniques herein disclosed, the above problem is avoided with ECC circuits implemented in independent circuit portion, each circuit portion having a different correction power and independent activation based on the determined number of errors.

According to an exemplary embodiment, a method for operating an array of memory cells comprises the steps of storing user data in a plurality of memory cells of the memory array, storing parity data associated with the user data in a determined number of parity cells of the memory array, the parity data corresponding to a plurality of selectable Error Correction Code (ECC) correction capabilities from a minimum ECC correction capability to a maximum ECC correction capability, calculating an ECC syndrome from the stored user data and parity data, based on the ECC syndrome, determining a number of errors in the data, and based on the determined number of errors, selecting an ECC correction capability of the plurality of ECC correction capabilities.

If not explicitly indicated, method steps are not necessarily in the disclosed sequence.

The present disclosure also relates to a memory device comprising an array including a plurality of memory cells, and a controller configured to store user data in a plurality of memory cells of the memory array and to store parity data associated with the user data in a determined number of parity cells of the memory array, the parity data corresponding to a plurality of selectable Error Correction Code (ECC) correction capabilities from a minimum ECC correction capability to a maximum ECC correction capability, the memory device further comprising an operating circuit configured to calculate an ECC syndrome from the stored user data and parity data, based on the ECC syndrome, determine a number of errors in the data, and based on the determined number of errors, select an ECC correction capability of the plurality of ECC correction capabilities.

According to another exemplary embodiment, a memory device comprises an array including a plurality of memory cell, and an encoding unit configured to store user data in a plurality of memory cells of the memory array, and store parity data associated with the user data in a determined number of parity cells of the memory array, the parity data corresponding to a plurality of selectable Error Correction Code (ECC) correction capabilities from a minimum ECC correction capability to a maximum ECC correction capability. The memory device also includes a decoding unit comprising a syndrome calculating unit configured to calculate an ECC syndrome from the stored user data and parity data, an error unit configured to determine a number of errors in the data based on the ECC syndrome, a plurality of circuit portions configured to perform a respective ECC operation on the stored data, and a selector element configured to enable a circuit portion of said plurality of circuit portions based on the determined number of errors, so as to select an ECC correction capability of the plurality of ECC correction capabilities on the basis of the determined errors. In an embodiment, the plurality of circuit portions comprises a specific circuit portion for each single specific selectable ECC correction capability, and said operating circuit is configured to selectively activate one of said single specific circuit portions for each single specific selectable ECC correction capability. Alternatively, the plurality of circuit portions may comprise a circuit portion which is selectively activable for managing at least two ECC correction capabilities, the operating circuit being configured to selectively activate said circuit portion for applying a first ECC correction capability and at least one higher ECC correction capability, said ECC correction capabilities corresponding to respective determined error numbers. In an embodiment at least two circuit portions share common circuitry.

All the features disclosed above may be applied also to these exemplary memory devices.

A related system is also disclosed, the system comprising a host device, a memory device comprising an array of memory cells, and a controller configured to store user data in a plurality of memory cells of the memory array, store parity data associated with the user data in a determined number of parity cells of the memory array, the parity data corresponding to a plurality of selectable Error Correction Code (ECC) correction capabilities from a minimum ECC correction capability to a maximum ECC correction capability, calculate an ECC syndrome from the stored user data and parity data, based on the ECC syndrome, determine a number of errors in the data, based on the determined number of errors, select an ECC correction capability of the plurality of ECC correction capabilities. For example, the system may comprise any of a display communicatively coupled to the memory device or to the host, a network interface communicatively coupled to the memory device or to the host, and a battery coupled to provide power to said system. The controller may be integrated in the memory device or may be integrated in the host device, e.g., as part of a processor thereof, as disclosed above. All the features above can be applied to the memory device of this system.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause-and-effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. A method for operating an array of memory cells, the method comprising:
   storing user data in a plurality of memory cells of the memory array;
   storing a fixed number of bits comprising parity data associated with the user data in a number of parity cells of the memory array, the parity data allowing for selection of a plurality of selectable Error Correction Code (ECC) correction capabilities from a minimum ECC correction capability to a maximum ECC correction capability, the fixed number of bits corresponding to the maximum ECC correction capability;
   calculating an ECC syndrome from the stored user data and parity data;
   based on the ECC syndrome, determining a number of errors in the data; and based on the determined number of errors, selecting an ECC correction capability of the plurality of ECC correction capabilities.

2. The method of claim 1, wherein selecting an ECC correction capability comprises selectively activating a circuit portion of a plurality of circuit portions which are configured to perform an ECC operation on the stored data.

3. The method of claim 2, comprising selectively activating a single specific circuit portion for each single specific selectable ECC correction capability.

4. The method of claim 3, comprising selectively disabling circuit portions whose correction capability does not match the determined number of errors.

5. The method of claim 2, comprising selectively activating a circuit portion for managing at least two ECC correction capabilities, said circuit portion being selectively activable for applying a first ECC correction capability and at least one higher ECC correction capability, said ECC correction capabilities corresponding to respective determined error numbers.

6. The method of claim 1, wherein the user data and parity data are stored in a codeword generated by an encoding unit, and wherein the calculation of the syndrome and the determination of the number of errors based on said syndrome is performed by a decoding unit.

7. The method of claim 6, wherein calculating the syndrome comprises activating a syndrome generating unit of the decoding unit, and wherein selecting an ECC correction capability comprises activating a syndrome decoding unit of said decoding unit.

8. The method according to claims 2, comprising selectively enabling an output of the selectively activated circuit portion of the plurality of circuit portions based on the determined number of errors.

9. The method of claim 1, comprising activating an error unit to determine the number of errors if the calculated syndrome exhibits at least one value different from zero.

10. The method of claim 1, comprising the step of grouping the memory cells of the array into a plurality of portions, each portion of the plurality of portions being operated at respective maximum ECC correction capability, and wherein a portion corresponds to one of a codeword, a bank, a bank group, a section of the array, the entire array, a buffer, and a page.

11. A memory device comprising:
an array including a plurality of memory cells; and
a controller configured to:
store user data in a plurality of memory cells of the memory array; and
store a fixed number of bits comprising parity data associated with the user data in a number of parity cells of the memory array, the parity data allowing for selection of a plurality of selectable Error Correction Code (ECC) correction capabilities from a minimum ECC correction capability to a maximum ECC correction capability, the fixed number of bits corresponding to the maximum ECC correction capability;
the memory device further comprising an operating circuit configured to:
calculate an ECC syndrome from the stored user data and parity data;
based on the ECC syndrome, determine a number of errors in the data; and
based on the determined number of errors, select an ECC correction capability of the plurality of ECC correction capabilities.

12. The memory device of claim 11, comprising a plurality of circuit portions, each circuit portion being configured to perform a specific ECC operation on the stored data and being selectively activable by the operating circuit.

13. The memory device of claim 12, comprising a single specific circuit portion for each single specific selectable ECC correction capability, wherein the operating circuit is configured to selectively activate one of said specific circuit portions based on the determined number of bit errors.

14. The memory device of claim 13, wherein the operating circuit is configured to selectively disable circuit portions whose correction capability does not match the determined number of errors.

15. The memory device of claim 12, comprising a circuit portion which is selectively activable for managing at least two ECC correction capabilities, the operating circuit being configured to selectively activate said circuit portion for applying a first ECC correction capability and at least one higher ECC correction capability, said ECC correction capabilities corresponding to respective determined error numbers.

16. The memory device of claim 12, wherein the operating circuit comprises a decoding unit in turn including:
a syndrome generating unit configured to generate the syndrome; and
a syndrome decoding unit configured to process said syndrome and to perform a corresponding ECC operation, said decoding unit comprising said circuit portions.

17. The memory device of claim 11, wherein the operating circuit is an ECC engine embedded into the controller of the memory device.

18. The memory device according to claim 12, wherein the operating circuit comprises at least one selector element configured to selectively enable an output of a selectively activated circuit portion based on the selected ECC correction capability.

19. The memory device according to claim 11, comprising an error unit, wherein the operating circuit is configured to enable said error unit if the calculated syndrome exhibits at least one value different from zero.

20. The memory device of claim 11, wherein the array is divided into a plurality of portions, each portion of the plurality of portions being operable at respective maximum ECC correction capability, and wherein a portion corresponds to one of a codeword, a bank, a bank group, a section of the array, the entire array, a buffer, and a page.

21. A memory device comprising:
an array including a plurality of memory cells;
an encoding unit configured to:
store user data in a plurality of memory cells of the memory array, and
store a fixed number of bits comprising parity data associated with the user data in a number of parity cells of the memory array, the parity data allowing for selection of a plurality of selectable Error Correction Code (ECC) correction capabilities from a minimum ECC correction capability to a maximum ECC correction capability, the fixed number of bits corresponding to the maximum ECC correction capability;
a decoding unit comprising:
a syndrome calculating unit configured to calculate an ECC syndrome from the stored user data and parity data,
an error unit configured to determine a number of errors in the data based on the ECC syndrome, a plurality of circuit portions configured to perform a respective ECC operation on the stored data, and a selector element configured to enable a circuit portion of said plurality of circuit portions based on the determined number of errors, so as to select an ECC correction capability of the plurality of ECC correction capabilities on the basis of the determined number of errors.

22. The memory device of claim 21, wherein:

said plurality of circuit portions comprises a specific circuit portion for each single specific selectable ECC correction capability, and said operating circuit is configured to selectively activate one of said single specific circuit portions for each single specific selectable ECC correction capability, or said plurality of circuit portions comprises a circuit portion which is selectively activable for managing at least two ECC correction capabilities, the operating circuit being configured to selectively activate said circuit portion for applying a first ECC correction capability and at least one higher ECC correction capability, said ECC correction capabilities corresponding to respective determined error numbers.

23. The memory device of claim 21, wherein at least two circuit portions share common circuitry.

24. A system comprising:

a host device;

a memory device comprising an array of memory cells; and a controller configured to:

store user data in a plurality of memory cells of the memory array;

store a fixed number of bits comprising parity data associated with the user data in a number of parity cells of the memory array, the parity data allowing for selection of a plurality of selectable Error Correction Code (ECC) correction capabilities from a minimum ECC correction capability to a maximum ECC correction capability, the fixed number of bits corresponding to the maximum ECC correction capability;

calculate an ECC syndrome from the stored user data and parity data;

based on the ECC syndrome, determine a number of errors in the data; and based on the determined number of errors, select an ECC correction capability of the plurality of ECC correction capabilities.

25. The system of claim 24, further comprising any of a display communicatively coupled to the memory device or to the host, a network interface communicatively coupled to the memory device or to the host, and a battery coupled to provide power to said system.

* * * * *